April 12, 1927.
F. HUBER
1,624,413
FUEL ADMISSION DEVICE FOR HEAVY OIL ENGINES
Filed Nov. 24. 1924
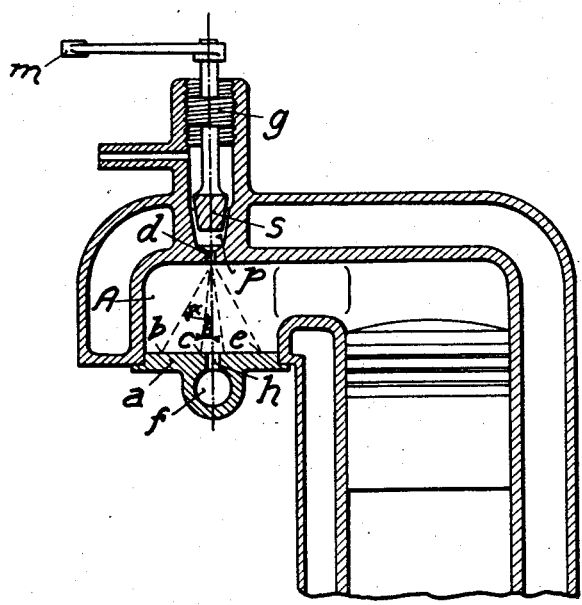

Patented Apr. 12, 1927.

1,624,413

UNITED STATES PATENT OFFICE.

FRITZ HUBER, OF MANNHEIM, GERMANY, ASSIGNOR, BY MESNE ASSIGNMENTS, TO HEINRICH LANZ, AKTIENGESELLSCHAFT, OF MANNHEIM, BADEN, GERMANY, A CORPORATION OF GERMANY.

FUEL-ADMISSION DEVICE FOR HEAVY-OIL ENGINES.

Application filed November 24, 1924, Serial No. 752,058, and in Germany February 2, 1924.

Heavy oil engines in which the fuel on emerging from the nozzle is sprayed by a spirally grooved guide inserted in the mouth of the nozzle so as to impart a whirling motion to the fuel frequently have the disadvantage that they stop under a small load or when running free due to the ignition missing. In such an arrangement the fuel, which is sprayed or vaporized, after emerging from the nozzle forms a cone which, in the form of an annulus encounters an incandescent plate arranged for example in the wall opposite the nozzle, where it is vaporized, and on the compression being increased is ignited. In the case of a reduced load, the amount of fuel which encounters the incandescent plate is so small that the mixture of fuel and air formed is too poor to ignite.

This invention consists in an arrangement by which, with a decrease in the load, the apex angle of the fuel cone is diminished so that when "idling" or running free this angle is very substantially reduced. The annulus of contact of the fuel with the incandescent plate is thereby reduced and the mass of the fuel is correspondingly denser while the mixture of air and fuel are correspondingly richer, so that even when running free ignition takes place with certainty within the annulus of contact, which is still further ensured by the incandescent plate remaining hot in the middle longer than at its outer portion.

Ignition devices are known in which a nozzle in a vaporizing chamber is located opposite an incandescent plate in the centre of which is an aperture communicating with the interior of a hot bulb connected to the plate by a neck. With full load a portion of the mixture of fuel and air is forced into the bulb that forms a preliminary ignition chamber where it impinges against the hot walls of the said preliminary ignition chamber and ignites whereupon the gas fires back in jets of flame through the said neck into the ignition chamber and ignites the remainder of the mixture of fuel and air. When the engine is running free the core of the fuel cone is very poor in fuel so that on compression hardly any fuel is forced into the ignition chamber but practically only fresh air, so that ignition in said chamber cannot therefore take place. Now with the device according to the present invention a very rich mixture is forced into the aforesaid neck during free running in consequence of the small angle of dispersion, and this mixture can still be ignited with certainty even if the walls of the ignition chamber have become cooler than when running on full load.

In my United States Patent No. 1,531,787, dated March 31, 1925, there is described a device for ensuring idle running in heavy oil engines, in which the fuel is sprayed in the form of a cone and projected against the incandescent plate by the use of a regulator provided with helical grooves and arranged so as to be displaceable relatively to the nozzle. This regulator was however cylindrical whereas according to the improvement forming the subject matter of the present invention the regulator is given the shape of a truncated cone and that part of the nozzle chamber adjacent to the nozzle is correspondingly shaped. Consequently there is a lateral clearance around the regulator which according to the adjustment of the same restricts to a greater or less extent the whirling action produced by the helical grooves. Thus with the device according to this invention a shorter stroke of the regulator produces the same result as is achieved by the movement of the cylindrical regulator previously referred to.

This device according to the invention is illustrated in the accompanying drawing.

In the said drawing $a$ indicates the ignition plate and $f$ the preliminary ignition chamber, while $h$ is a neck communicating between this chamber and the vaporizing chamber A. $s$ indicates the regulator which as shown is shaped like a truncated cone and is provided with a spiral groove and is arranged so as to be displaceable relatively to the nozzle $d$, the rod of the regulator $s$ being provided for example at the upper end with a thread $g$ and a lever $m$ so that by turning the lever $m$ the regulator $s$ can be brought nearer to or away from the nozzle by means of the screw thread $g$. The conical chamber $p$ between the regulator and the nozzle is thereby enlarged or reduced and consequently in this chamber $p$ a variable quantity of fuel may be collected. The fuel contained in the said chamber $p$ now has a whirling motion imparted to it as a result of the thrust exerted by the piston of the fuel pump which forces the fuel through the spiral threads of the regulator s. It is to be especially noted in connection with the truncated cone shape of the regulator S and its chamber, that a lateral clearance is produced around said regulator and that, due to this, a shorter stroke of the regulator may be attained and corresponding to the adjustment of the regulator the whirling action of the fuel produced by the helical action of the grooves around the circumference of the regulator is more or less restricted.

The fuel is thereby accelerated the amount of acceleration being dependent on the quantity of fuel present in the chamber $p$, that is to say dependent on the distance of the regulator $s$ from the mouth of the nozzle. The greater the space $p$ the smaller the acceleration and vice versa. The angle at which the fuel cone is developed is however also directly dependent on the acceleration. If the fuel has a high speed of rotation the angle is greater, and vice versa the angle is smaller if the fuel has a smaller speed of rotation, so that when the regulator $s$ is screwed down and the space $p$ is made small, a larger apex angle such as $\alpha$ is formed, and when the regulator $s$ is screwed upwardly and the space $p$ is made larger, a small apex angle such as $\beta$ is formed.

Claims:

1. A fuel admission device for internal combustion engines, including a cylinder forming a nozzle and having a chamber, means for admitting fuel to said nozzle, and a regulator shaped as a truncated cone movable in said chamber and having a lateral clearance with respect to the wall thereof to vary the size of said chamber whereby the acceleration of the fuel through the nozzle is in inverse ratio to the size of said chamber.

2. A fuel admission device for internal combustion engines, including a cylinder forming a fuel nozzle and having a chamber of a truncated cone shape and through which the fuel passes in the form of a cone, means for admitting fuel to said cylinder, and a regulator also shaped as a truncated cone movable in said chamber and having a lateral clearance with respect to the wall thereof to vary the acceleration of fuel from the nozzle in accordance with variations in the load of the engine.

3. A fuel admission device for internal combustion engines, including a cylinder forming a fuel nozzle and having a chamber of a truncated cone shape and through which the fuel passes in the form of a cone, means for admitting fuel to said cylinder, and a regulator also shaped as a truncated cone and provided with spiral grooves therein, said regulator having a lateral clearance with respect to the wall of the chamber and being movable in said chamber to vary the acceleration of fuel from the nozzle in accordance with variations in the load of the engine.

4. A fuel admission device for internal combustion engines, including a cylinder forming a nozzle and having a chamber, means for admitting fuel to said nozzle, a regulator shaped as a truncated cone movable in said chamber and having a lateral clearance with respect to the wall thereof to vary the size of said chamber whereby the acceleration of the fuel through the nozzle is in inverse ratio to the size of said chamber, an ignition plate disposed opposite the fuel nozzle, and an ignition chamber formed as a part of said plate and having means affording communication between said chamber and the interior of the cylinder head, said communicating means being arranged coaxially with the fuel nozzle.

5. A fuel admission device for internal combustion engines, including a cylinder forming a nozzle and having a chamber of truncated cone shape, a piston member also having a portion shaped as a truncated cone movable in said chamber and having spiral grooves therein, the surface of said cone portion having a lateral clearance relative to the wall of said chamber, said piston member being further provided with a portion having threaded engagement with said cylinder, and means for turning said piston member to vary the size of said chamber whereby the acceleration of the fuel through the nozzle is in inverse ratio to the size of said chamber.

6. A fuel admission device for internal combustion engines, including a cylinder forming a nozzle and having a chamber of truncated cone shape, a piston member also having a portion shaped as a truncated cone movable in said chamber and having spiral grooves therein, the surface of said cone portion having a lateral clearance relative to the wall of said chamber, said piston member being further provided with a portion having threaded engagement with said cylinder, means for turning said piston member to vary the size of said chamber whereby the acceleration of the fuel through the nozzle is in inverse ratio to the size of said chamber, an ignition plate arranged opposite said fuel nozzle, and an ignition chamber formed as a part of said plate and having means affording communication between said ignition chamber and the interior of the cylinder head, said communicating means being arranged coaxially with said fuel nozzle.

7. A fuel admission device for internal combustion engines, including a cylinder forming a fuel nozzle, a vaporizing chamber adjacent said cylinder, an ignition plate opposite said cylinder, an ignition chamber formed as a part of said plate and having means affording communication between said ignition and vaporizing chambers, a piston member in said cylinder having a portion shaped as a truncated cone and having spiral grooves therein, the surface of said cone portion having a lateral clearance relative to the wall of said chamber, said piston member being further provided with a portion having threaded engagement with said cylinder, means for admitting fuel into said cylinder between the point of threaded engagement of the piston member therewith and the cone portion of said piston member, and means for moving said piston member in said chamber to vary the acceleration of fuel from the nozzle in accordance with variations in the load of the engine.

8. A fuel admission device for internal combustion engines, including a cylinder forming a fuel nozzle, a vaporizing chamber adjacent said cylinder and into which fuel is sprayed from said cylinder, an ignition chamber formed as a part of said plate and having means affording communication between said ignition and vaporizing chambers, a piston member having a portion shaped as a truncated cone movable in said cylinder and having a lateral clearance with respect to the wall thereof, a spindle extending from said piston member and having a portion in threaded engagement with the wall of said cylinder, an extension projecting from said threaded portion, means for admitting fuel into said cylinder between said threaded portion of the spindle and said piston member, and a lever on the extension of said spindle for rotating the same to move said piston member in said chamber to vary the acceleration of fuel from the nozzle in accordance with the variations in the load of the engine.

In testimony whereof I have signed my name to this specification.

Dr. FRITZ HUBER.